UNITED STATES PATENT OFFICE.

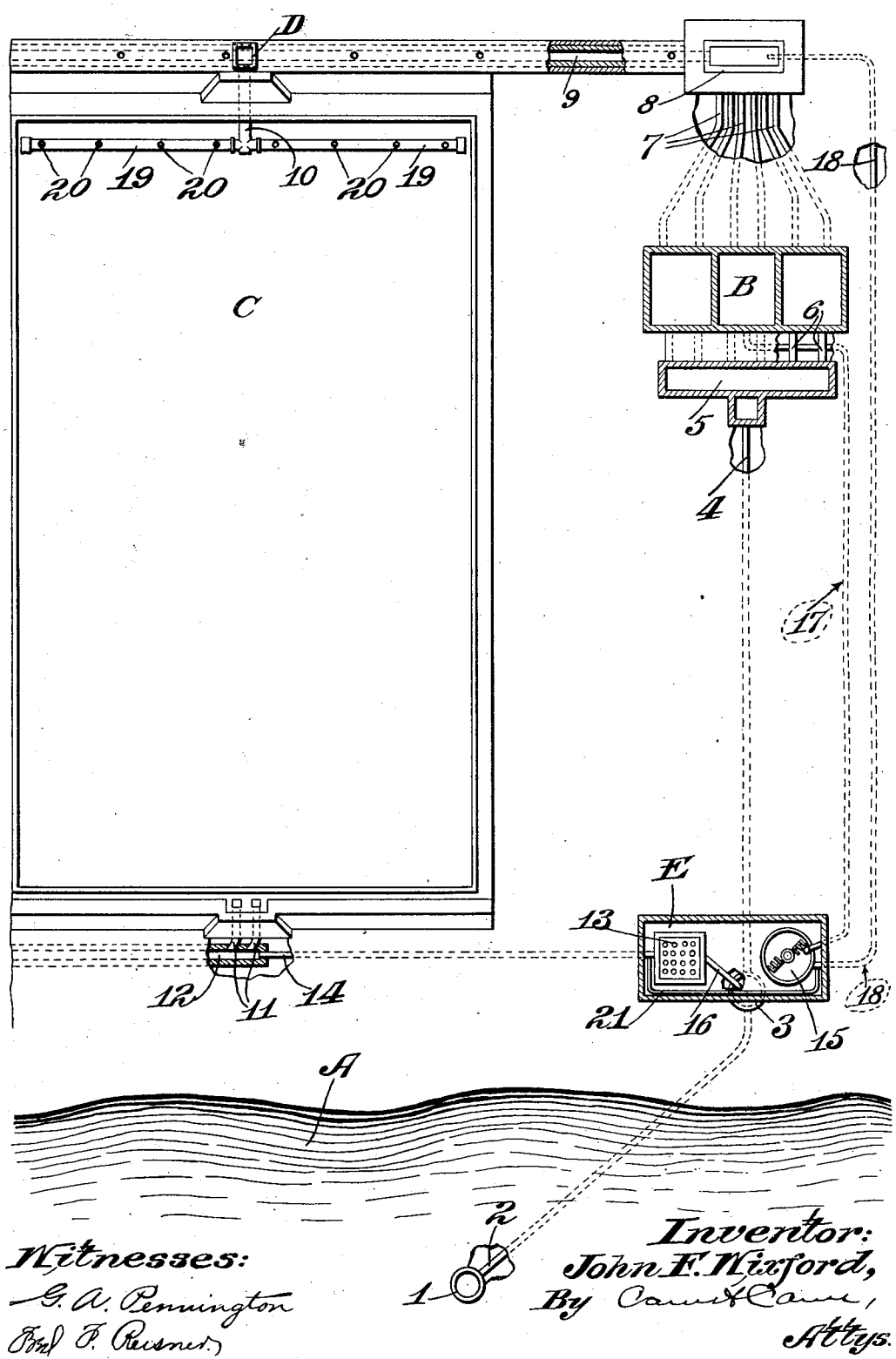

JOHN F. WIXFORD, OF ST. LOUIS, MISSOURI.

WATER-PURIFICATION SYSTEM.

No. 814,634.        Specification of Letters Patent.        Patented March 6, 1906.

Original application filed May 1, 1905, Serial No. 258,228. Divided and this application filed October 21, 1905. Serial No. 283,732.

*To all whom it may concern:*

Be it known that I, JOHN F. WIXFORD, a citizen of the United States, and a resident of the city of St. Louis and State of Missouri, have invented a new and useful Improvement in Water-Purification Systems, of which the following is a specification.

It is noted that this is a division of my application filed May 1, 1905, Serial No. 258,228.

My invention relates to systems for the purification of the water-supplies of cities, and has for its principal objects to provide a system of water purification capable of application to waterworks plants of existing types; to purify water by the use of reagents, which will cause the impurities to be precipitated; to introduce the reagents into the water separately, so that none of the reagents shall be wasted in mutual reactions; to introduce reagents simultaneously into the same stream, but at points so far apart that the reactions of the reagent first added shall be substantially complete before the second reagent is added, and other objects hereinafter more fully appearing.

My invention consists in the arrangements and combinations hereinafter described and claimed.

The accompanying drawing shows a plan view of the entire system, the buildings being shown conventionally and but one settling-basin being included.

The improved system for the purification of water is shown for the purpose of illustration as applied to a waterworks plant employing settling-basins. The supply of water is supposed to be derived from a river A, in which is built an intake-tower 1. An intake tunnel or conduit 2 leads from the intake-tower to an uptake-shaft 3, which rises to the level of the ground. A tunnel or conduit 4 connects with the uptake-shaft at a point considerably above the entrance-point of the intake tunnel or pipe and conveys the water to a wet-well 5. Pipes 6 lead from the wet-well to a pump-house B, in which are located pumps that force the water through the pipes 7 to a delivery-well 8. A conduit 9 leads from the delivery-well along one end of the settling-basins C, of which one is shown. A pipe 10 leads from the conduit 9 into the settling-basin, and the admission of water is controlled by gates beneath a gate-house D. The water emerges from the settling-basin at its opposite end through pipes 11 into a clear-water conduit 12, which runs along the ends of the settling-basins. The plant so far as described is one of known type. To it my system is applied without any necessity for reconstruction of the plant, the adaptation being accomplished solely by means of additions. This adaptability of the system to existing plants without necessitating expensive reconstruction is one of its merits.

The process of purification for which this system is primarily adapted contemplates the coagulation of the matter to be eliminated by the addition of a reagent, such as a solution of ferrous sulfate, to the water at one point, and the subsequent addition of hydrate of lime—for example, milk of lime—in quantities greatly in excess of that necessary to satisfy the ferrous sulfate in solution. This process is fully described and claimed in my application for patent filed September 23, 1904, Serial No. 225,611.

A coagulating-house E is provided for the preparation of reagents, its location being preferably over or adjacent to the uptake-shaft 3. In the coagulating-house are arranged a tank 13, or a plurality of tanks, in which the solution of ferrous sulfate is continuously prepared, hereinafter spoken of as the "iron tanks," and a lime-digester 15, or a plurality of lime-digesters, in which the milk of lime is continuously prepared.

A pipe 14 conducts water from the clear-water conduit to the iron tank, the water entering the tank through a number of nozzles arranged at the bottom of the tank. The tank contains a mass of ferrous-sulfate crystals, which is replenished from time to time and through which the water rises, dissolving the ferrous sulfate. The solution of ferrous sulfate is preferably continuously prepared by the process described and claimed in my Patent No. 806,945, granted to me under date of December 12, 1905. A pipe 16 is connected to the tank 13 near its top and communicates with the raw water at a point beyond which the water is agitated for some time before it enters the settling-basin. As the most violent agitation is in the delivery-well, it is desirable to lead the sulfate into the water at the well or before the water reaches the well. The connection shown in the drawing is a convenient one, wherein the pipe 16 leads into the uptake-shaft. As the ferrous-sulfate solution in the tank rises to the level of the opening into the pipe 16 it flows through it into the raw water as it passes through the uptake-shaft.

A pipe 17 leads from the pump-house and empties into the lime-digester 15. This pipe carries hot water, which is admitted into the digester just above the level of the stirrer. The milk of lime is preferably prepared by the process described and claimed in my Patent No. 806,946, granted to me under date of December 12, 1905. A discharge-pipe 18 leads from the digester 15, being connected thereto near the top, conducts the milk of lime to the delivery-well 8, and empties thereinto. If the delivery-well is above the level of the lime-digester, it will be necessary to connect a pump (not shown) with the pipe 18. The milk of lime is hot and quite concentrated as it leaves the digester. To cool and dilute the milk of lime, water is introduced into the discharge-pipe 18 near its point of connection with the digester by means of a branch pipe 21, leading from the pipe 14.

The water emptying into the delivery-well carries or is there treated with the requisite amount of ferrous sulfate in solution. The pump-pipes empty into the delivery-well at some distance above the level of the water therein, and thus the water is kept in a state of violent agitation. The milk of lime enters the water at this point. The agitation in the delivery-well and in the conduit leading therefrom keeps the products of the ferrous-sulfate reactions in suspension until the lime reactions have had time to take place. By the time the water reaches the settling-basins the reactions are substantially complete and the resulting insoluble precipitates are held in suspension and are ready to be deposited as soon as the water is quiet enough to permit sedimentation. In this condition the water enters the basins.

Lateral branch pipes 19 are connected to the pipe 10, leading from the conduit 11 to the basin 13. Vertical pipes 20 lead upwardly from the branch pipes 19 to within two or three feet of the water-level in the basin. Thus the volume of water entering the basin is broken up into a number of small vertical streams and violent agitation in the basin is avoided. As the pipes 20 are uniformly distributed across the end of the basin, a practically uniform current of flow is induced over the entire width of the basin. Consequently the velocity of the flow can be quite low and the water will be comparatively quiet, a condition to be desired for sedimentation. Experience has shown that nearly all of the precipitates will coagulate and come down in a short time and within a short distance from the point of admission of the water. Thus by far the larger part of the sediment will be deposited near the end of the basin at which the water is admitted.

The operation of the system is as follows: The water enters through the river-conduit 2, rises in the uptake-shaft 3, and is pumped through the conduit 4. The solution of the ferrous sulfate is continuously introduced into the water at the uptake-shaft. The water is sufficiently agitated in the conduit in going through the pumps and the conduits 7 to thoroughly distribute the ferrous sulfate therethrough. The milk of lime is continuously introduced into the delivery-well. The water enters the delivery-well some distance above the level of the water therein, and thus there is violent agitation in said well. On account of the length of the conduit the lime reactions will have an opportunity to take place before the water reaches the basin. The flow through the conduit keeps the water agitated and prevents precipitation. Under such circumstances the water is in condition for rapid coagulation and for precipitation to occur as soon as the agitation ceases. The water enters the basin through the pipes 10 19 20. Thus the stream flowing into the basin is subdivided into a number of small streams regularly distributed over the width of the basin. The pipes 20 being directed upwardly, the velocity of the inflowing streams is partly reduced by gravity and partly by the water above the tops of the pipes. Thus there is practically no impulse due to the inflowing streams in the direction of flow through the basin, and the water comparatively near the said pipes will be quiet. Hence the impurities will be rapidly precipitated and by far the greater part of them will be deposited in a very short time after the water has entered the basin.

Obviously the system is capable of considerable modification within the scope of my invention, and therefore I do not wish to be limited to the specific construction shown and described.

What I claim as my invention, and desire to secure by Letters Patent, is—

1. A system of water purification comprising a settling-basin, a main conduit emptying into said basin, a reagent-solution tank, a lime-digester, two conduits extending through said tank and said digester, respectively, and opening into said main conduit at different points, the point nearer the basin being at such a distance from the basin that the water will require several minutes to flow therefrom into the basin.

2. A system of water purification comprising a settling-basin, a main conduit emptying into said basin, a reagent-solution tank, a lime-digester, two conduits extending through said tank and said digester respectively and both opening into said main conduit far enough from said basin to require several minutes for the water to reach the basin from such points of opening into said main conduit.

3. A system of water purification comprising a settling-basin, a conduit emptying into said basin, means to introduce a reagent into said conduit, a lime-digester and a conduit extending through said lime-digester into said first-mentioned conduit at a point between said basin and the point of admission of said reagent.

4. A system of water purification comprising a settling-basin, a delivery-well, a conduit connecting said well and said basin, a supply-conduit emptying into said well, means to introduce a reagent into said supply-conduit, a lime-digester and a conduit extending through said digester into said delivery-well.

5. A system of water purification comprising a settling-basin, a supply-conduit emptying into said basin, a reagent-solution tank and a lime-digester, clear-water conduits emptying into said tank and said digester, respectively, a conduit connecting said tank to said supply-conduit at a distance from said basin, and a conduit connecting said lime-digester with said supply-conduit at a point nearer said basin.

6. A system of water purification comprising a settling-basin, a delivery-well, a conduit connecting said basin and said well and communicating with said well near the bottom, a supply-conduit opening into said well near the top, a reagent-solution conduit arranged to introduce a reagent into said supply-conduit, and means to introduce a second reagent into said delivery-well, said means comprising a conduit having a lime-digester therein.

7. A system of water purification comprising a settling-basin, a delivery-well, a conduit connecting said basin and said well, a supply-conduit emptying into said well, a reagent-solution conduit opening into said supply-conduit at a distance from said well, and means for introducing a second reagent near the point of connection of said supply-conduit with said well, said means comprising a conduit containing a lime-digester.

In witness whereof I have signed my name to this specification, in the presence of two subscribing witnesses, this 19th day of October, 1905, at St. Louis, Missouri.

JOHN F. WIXFORD.

Witnesses:
FRED F. REISNER,
J. B. MEGOWN.